Aug. 26, 1947.                E. E. HEDENE                2,426,212
                        AUTOMATIC CLOSING VALVE
                       Original Filed May 25, 1942
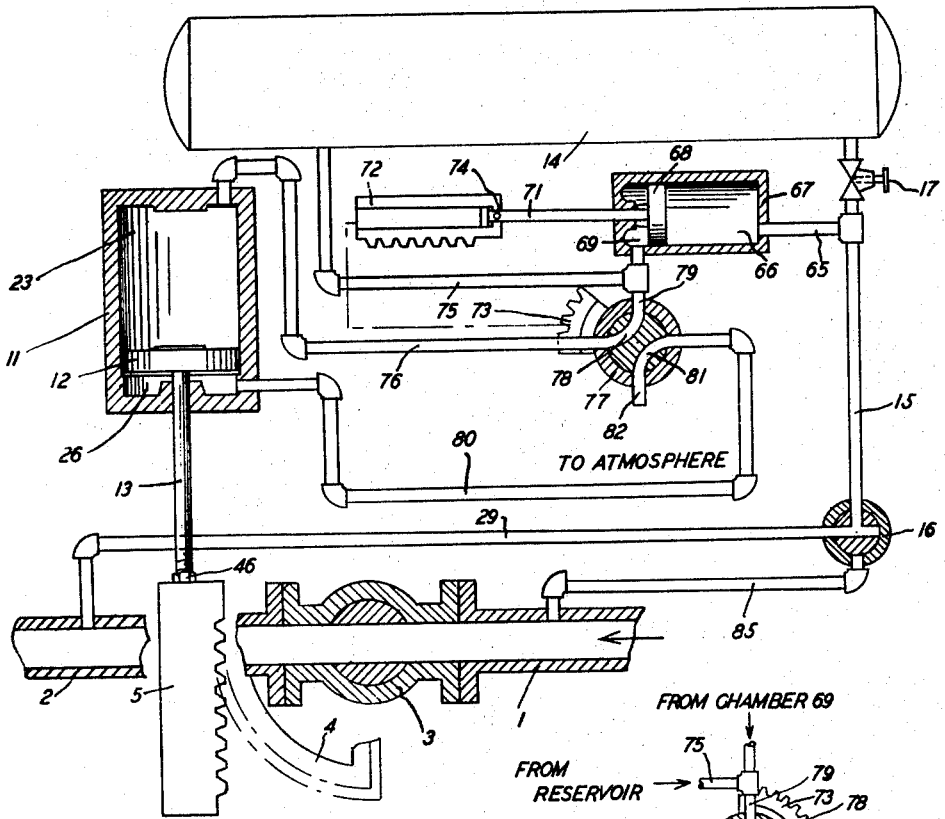
Fig.1.
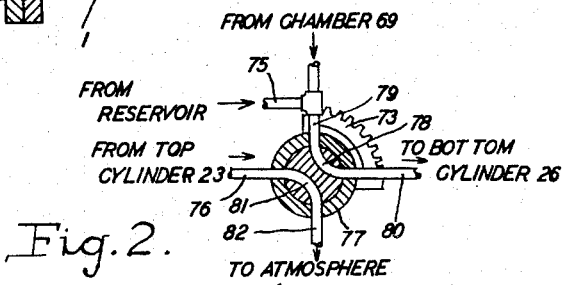
Fig.2.
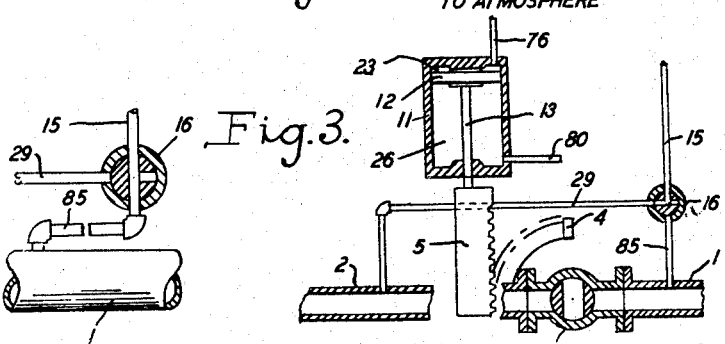
Fig.3.
Fig.4.
Inventor
EDWIN E. HEDENE
By Lewis D. Konigsford
                Attorney Patented Aug. 26, 1947

2,426,212

UNITED STATES PATENT OFFICE 2,426,212

AUTOMATIC CLOSING VALVE

Edwin E. Hedene, Oakland, Calif., assignor, by mesne assignments, to Rockwell Manufacturing Company, Pittsburgh, Pa., a corporation of Pennsylvania Original application May 25, 1942, Serial No. 444,335, now Patent No. 2,381,447, dated August 7, 1945. Divided and this application August 25, 1942, Serial No. 455,997

2 Claims. (Cl. 137—153)

1

The present invention relates to fluid operated check valves for use on fluid distribution mains or the like.

In my copending application, filed December 31, 1940, Serial No. 372,455, for Fluid operated check valve, now U. S. Patent No. 2,302,370, granted November 17, 1942, I describe and claim a construction in which a main valve in a pipe line is operated by fluid pressure actuating means connected to a reservoir and the pipe line with a throttle valve between the connections, and which will operate to close the main valve should a break occur in the pipe line. Such construction can be applied where the pressure differential across the throttle valve is high enough to actuate the main valve actuating means.

The present invention is applicable to constructions wherein the pressure differential across the throttle valve is not great enough to operate the main valve actuating means, and in the preferred embodiment of the present invention I employ a switching valve for the main valve actuating means and a pilot pressure actuated means for the switching valve so connected that the main valve actuating means is operted by the differential between the pipe line pressure and the atmosphere. This construction enables the use of a smaller valve actuating means, and for example, where a piston and cylinder are employed as a valve actuating means, the piston and cylinder may be of smaller diameter, thus effecting a saving in material. Also, if desired, the valve actuating means may be operated by a smaller differential across the throttle valve than in the modification shown in said application.

The invention will be described in greater detail in the following specification taken in connection with the accompanying drawing wherein Figure 1 is a view diagrammatically illustrating a preferred embodiment of the invention, Figure 2 is a diagrammatic view showing the opposite position of the switching valve, Figure 3 is a schematic view showing the main valve closed, and Figure 4 is a diagrammatic view showing a switched position of valve 16.

Referring to the drawing, there is shown a pipeline comprising an upstream portion 1 and a downstream portion 2 having a valve 3 inter-

2 posed therein. As shown, this valve preferably is of the rotary plug type and has a gear segment 4 secured to its stem adapted to be operated by a gear rack 5.

A cylinder 11 is suitably supported from the valve casing and has a piston 12 therein connected by a screw threaded rod 13 and a lock nut 46 or the like to the rack 5. A reservoir 14 is provided which normally is supplied by and is maintained at the same pressure as the pipe line, by means of a conduit 15, valve 16 and conduit 29 connected downstream from valve 3. Conduit 15 has a valve 17 therein of a type which may serve as a throttle or choke valve. The upper chamber 23 of the cylinder 11 above the piston is connected by a conduit 76 through a passageway 78 in a switching valve 77 and conduits 79 and 75 to one side of the throttle valve 17, this connection being made in the preferred embodiment to the reservoir 14. The lower chamber 26 is exhausted to atmosphere through conduit 80, passageway 81 in the switching valve and conduit 82, so that the pressure across piston 12 is pipe line pressure on one side and atmospheric pressure on the other. When switching valve 77, which preferably is of the four-way plug type, is turned to the position shown in Figure 2, the lower chamber 26 connects through conduit 80, passageway 78 and conduits 79 and 75 to the reservoir 14 and at the same time the upper chamber 23 exhausts to atmosphere through conduit 76, passageway 81 and conduit 82. Thus, the application of fluid pressure across the piston 12 is reversed.

The actuating mechanism for valve 77 preferably comprises a cylinder 67 having a piston 68 therein to provide chambers 66 and 69 on opposite sides thereof which are connected to opposite sides of throttle valve 17. Thus, chamber 66 is connected by conduit 65 to conduit 15 on the pipeline side of throttle valve 17, and chamber 69 is connected by conduits 79 and 75 to the reservoir side of the throttle valve. Piston 68 has a stem or rod 71 with a head engaging one end of a slot in rack 72, so that rack 72 can be moved in one direction only. However, a removable pin 74 passing through the rack and piston rod links them together so that rod 71 and rack 72 may move together in the opposite direction. Normally the pin 74 is not in place. Rack 72 meshes with a gear segment 73 on switching valve 77 to rotate the switching valve through a quarter turn.

The operation of the apparatus now will be described. In Figure 1 with the main valve 3 open so that gas can flow therethrough, the reservoir 14, chambers 66 and 69 of cylinder 67 and chamber 23 of cylinder 11 and all the piping will be at substantially the same pressure as the gas in pipe 2, and chamber 26 and conduit 80 will be at atmospheric pressure. In the normal operation of the pipe line, the pressure of the gas in pipes 1 and 2 and in valve 3 may vary considerably, due to changes in the demand for gas or in the rate at which gas is fed into the pipe line. However, such normal changes in pressure are relatively gradual, allowing time for sufficient gas to pass through throttle valve 17 into or out of reservoir 14 to maintain the pressure in the reservoir in substantial equilibrium with the pressure in the pipe line. Likewise, the pressures in chambers 66 and 69, at opposite sides of the piston 68, will remain in substantial equilibrium and will not produce sufficient differential pressure to move piston 68 and the mechanism to which it is connected.

Should a break occur in the line in the downstream conduit 2, the pressure in the pipes 1 and 2 will fall rapidly and the pressure in conduit 15 also will fall. Because of the throttling action of valve 17, the gas in chamber 69 of the pilot cylinder 67 cannot flow through conduits 79 and 75 and reservoir 14 into conduit 15 as rapidly as gas from chamber 66 can flow through conduit 65 into conduit 15, so that the pressure in chamber 66 falls rapidly and the pressure in chamber 69 moves piston 68 to the right and through rack 72 and gear segment moves valve 77 to the position shown in Figure 2. In this position chamber 23 exhausts to atmosphere through conduit 76, passageway 81 and conduit 82, and chamber 26 becomes connected with the reservoir 14 through conduit 80, passageway 78 and conduits 79 and 75, to move piston 12 to its uppermost position and close valve 3 as shown in Figure 3. Due to the escape of gas from the break in main 2, the pressure in reservoir 14 and cylinders 11 and 67 falls to atmospheric pressure.

Upon repair of the break, valve 3 will not be actuated until the reservoir 14 is again filled with gas under pressure and switching valve 77 returned to the position shown in Figure 1. This is accomplished, first, by turning valve 16 to the position shown in Figure 4, thereby connecting conduit 85 to conduit 15, which will permit gas to flow into reservoir 14 through valve 17. Because of the restriction of valve 17, the pressure will rise more rapidly in chamber 66 than in chamber 69, thereby moving piston 68 back to the position shown in Figure 1. However, because of the telescoping connection between the rod 71 and the rack 72, the return movement of piston 68 will not move valve 77 from the position shown in Figure 2. Valve 77 then may be operated manually, returning it to the position shown in Figure 1, whereupon high pressure gas from reservoir 14 will be admitted to chamber 23, returning piston 12 to its lowermost position and reopening valve 3 for resumption of normal pipe line operation.

If the break occurs in pipe section 1 and section 2 is downstream therefrom, a similar action will occur. After piston 68 has moved to its right end position and has turned switching valve 77 to the position shown in Figure 2, the valve 3 will close and the pressure in section 1 will probably be reduced to atmospheric pressure by loss through the break, while the pressure in reservoir 14 and chambers 66, 69 and 26 will become equalized. After the break in main 1 is repaired, and pressure is let into the main, the valve 3 may be reopened by manually turning valve 77 back to the position shown in Figure 1 as heretofore described. However, if sufficient pressure to operate piston 12 and valve 3 has not been retained in pipe 2 and reservoir 14 during the time required to repair the break in pipe 1, valve 16 may be turned manually to the position shown in Figure 4, thereby admitting high pressure gas from pipe 1 to the valve operating system.

It should be observed that, with valve 16 either in the position shown in Figure 1 or in the position shown in Figure 4, the automatic closing system will operate to close valve 3 in the event of a break in either pipe 1 or pipe 2. Valve 16 permits withdrawal of high pressure gas from either pipe 1 or pipe 2 for the purpose of reopening valve 3 after an automatic closing operation has taken place and pressure has been subsequently reestablished in the main pipe line system.

This application is a continuation in part of said application Serial No. 372,455, and is a division of my copending application Serial No. 444,335, for Fluid pressure operated value, filed May 25, 1942.

What I claim as my invention and desire to secure by United States Letter Patent is:

1. In a fluid distribution system, the combination of a pipe line, a main valve in said pipe line, a reservoir for storing fluid under pressure, main fluid pressure responsive means connected to the reservoir for operating said main valve, a pilot valve in said connection for controlling the application of fluid pressure to said means, fluid pressure means having a direct operating connection with said pilot valve, a conduit between the pipe line on one side of the main valve and the reservoir including means restricting flow between the reservoir and the pipe line in both directions, a connection between the conduit and one side of said pilot valve operating means on the pipe line side of said restricting means, a second conduit between the reservoir and the other side of the pilot valve operating means whereby a rate of change in pressure in the pipe line greater than a balancing flow through the restricting means actuates the pilot valve operating means to actuate said main operating means and close the main valve, and said operating connection between the fluid pressure means and pilot valve including means preventing reverse operation of the pilot valve by fluid pressure.

2. Apparatus for automatically controlling a main valve in a fluid flow line comprising a fluid pressure responsive device having a movable member connected to said main valve and chambers on opposite sides of said member, a source of fluid pressure, a first conduit means connected between said source and said line including a manual valve for selectively connecting said first conduit means to said flow line upstream or downstream of said main valve, a restricted flow throttle valve in said first conduit means, a second conduit means connecting said source to one of said chambers, a reversing valve in said second conduit means, and a second fluid pressure responsive device connected across said throttle valve and directly actuating said reversing valve only in response to an abnormal pressure drop in the fluid flow line.

EDWIN E. HEDENE.

REFERENCES CITED

The following references are of record in the file of this patent:

UNITED STATES PATENTS

| Number | Name | Date |
|---|---|---|
| 2,041,862 | Rhodes | May 26, 1936 |
| 2,081,542 | Kidney | May 25, 1937 |
| 1,892,462 | Wait | Jan. 3, 1933 |
| 1,893,462 | Wait | Jan. 3, 1933 |
| 2,148,410 | Wait | Feb. 21, 1939 |
| 2,160,766 | Thomason | May 30, 1939 |
| 1,514,839 | Edwards | Nov. 11, 1924 |

FOREIGN PATENTS

| Number | Country | Date |
|---|---|---|
| 268,544 | Great Britain | Apr. 7, 1927 |